United States Patent [19]

Sandling

[11] 4,365,646
[45] Dec. 28, 1982

[54] VALVE ASSEMBLY

[75] Inventor: Michael J. Sandling, Barnstaple, England

[73] Assignee: Xomox Corporation, Cincinnati, Ohio

[21] Appl. No.: 219,346

[22] Filed: Dec. 22, 1980

[30] Foreign Application Priority Data

Jan. 8, 1980 [GB] United Kingdom .................. 8000539

[51] Int. Cl.³ .............................................. F16K 5/02
[52] U.S. Cl. ................................. 137/375; 137/454.6; 251/292; 251/293; 251/310; 251/317
[58] Field of Search ............... 251/309, 310, 292, 293, 251/317; 137/315, 375, 454.2, 454.6, 283, 284

[56] References Cited

U.S. PATENT DOCUMENTS

| | | | |
|---|---|---|---|
| 3,536,295 | 10/1970 | Sinkler | 251/317 |
| 3,809,114 | 5/1974 | Mueller et al. | 137/284 |
| 3,913,612 | 10/1975 | Tolnai | 137/454.6 |
| 3,930,635 | 1/1976 | Smith | 251/317 |
| 4,058,289 | 11/1977 | Hicks | 251/304 |
| 4,215,847 | 8/1980 | Hoos | 251/309 |

Primary Examiner—H. Jay Spiegel
Attorney, Agent, or Firm—Kinney & Schenk

[57] ABSTRACT

A valve assembly for use in a system carrying radioactive slurry. The valve assembly consists of a valve body with a bore, an inlet and an outlet port communicating with the bore; a valve member having a passage extending therethrough. The valve member is received in the bore of the valve body and is rotatable between a first position in which the passage of the valve member is aligned with the inlet and outlet ports of the valve body providing fluid communication between the inlet and outlet ports of the valve body and a second position in which the valve member shuts off or blocks the above fluid communication. The valve body and valve member are removable as a unit from the valve housing via a tubular extension which extends from the bore in the valve body to a location above and remote from the valve housing. This extension provides for the removal of the valve body and valve member as a unit from the valve housing and subsequent replacement thereof by a new unit or the old unit after repairs have been made thereon.

22 Claims, 15 Drawing Figures

VALVE ASSEMBLY

This invention relates to an improved valve assembly.

In the flow of a radioactive slurry, which is water having radioactive solids suspended therein, through pipes, it is necessary that the flow be controlled so as to be stopped whenever desired. The flow control valves are located in relatively inaccessible locations such as submerged in ponds or behind thick concrete shielding, for example, to provide protection to the operator from exposure to radioactivity. Because the slurry is radioactive and the valves are located so as to be relatively inaccessible, it is necessary that each valve be capable of being easily replaced without any danger of exposure to radioactivity to the person removing the valve and replacing it.

Radioactive contamination can occur in two ways. One of these is by the radioactive material being carried by the air. The other means of radioactive contamination occurs by what is known as "shines", which is when the radioactivity can pass between elements like a beam of light. Therefore, it is necessary to be able to prevent both types of radioactive contamination when removing a flow control valve from a radioactive slurry and replacing it.

The present invention satisfactorily solves this problem through providing a valve construction which can be used with an arrangement for sucking air from the atmosphere through a portion of the structure above the valve housing so that there can be no radioactive contamination of the air when replacing the valve. The present invention is also of use in other areas of contamination, for example when the valve is required for use in controlling the flow of highly toxic fluids in chemical processing plant.

According to the present invention there is provided a valve assembly comprising a valve body having a bore therein and having an inlet port and an outlet port communicating with said bore; and a valve member having a passage extending therethrough, said valve member being received in said bore for rotation between a first position in which said passage provides a communication between said inlet and outlet ports and a second position in which the valve member shuts off such communication characterised in that the valve body and the valve member are removable as a valve unit from a valve housing having a bore therein to receive said valve body with inlet and outlet ports in said valve body communicating with respective inlet and outlet ports in the valve housing, and in that said housing has a tubular extension extending from alignment with the bore therein to a location remote from and above said housing, said valve body has an extension connected thereto and extending upwardly therefrom within said tubular housing extension, first sealing means are disposed between the valve body extension and said housing tubular extension, a rotatable drive is disposed within said valve body extension for actuation at a location remote from and above said housing to rotate said rotatable valve member between its first and second positions, and second sealing means are disposed between said valve body extension and said rotatable drive.

Preferably a sealing sleeve mounted on the side wall of said valve body is disposed between said housing and said valve body and a sealing lining is disposed in the bore in the valve body; said valve body having ribs disposed in its bore and overlaid by said sealing lining to provide pressure sealing areas for said sealing lining to seal against said rotatable valve member and pressure relief areas for said sealing lining therebetween; and said valve body having ribs disposed on its outer side wall and overlaid by said sealing sleeve to provide pressure sealing areas for said sealing sleeve to seal against said housing and pressure relief areas for said sealing sleeve therebetween.

When handling a radioactive slurry, it is necessary that there be no leakage through the valve. The preferred valve assembly of the present invention eliminates this problem through utilizing a sealing arrangement in which pressure sealing areas are provided around each of the ports to form an effective seal while having pressure relief areas between tfhe pressure sealing areas. This arrangement ensures that the valve sealing means does not become damaged, if it should expand due to temperature increase, by the rotation of a rotatable valve member within a valve body.

These pressure sealing areas are provided through utilizing ribs on the bore or inner side wall of the valve body within which the rotatable valve member is disposed. The spaces between the ribs form pressure relief areas so that the sealing means, which is formed of a suitable plastics, can effectively seal at desired locations while having an area into which to flow so as to not be subjected to a sufficient stress to rip or tear.

When a valve unit, which comprises the valve body and the rotatable valve member therein, is disposed within a tapered bore in a valve housing, the valve body has a sealing sleeve on its outer side wall to form a seal with the tapered bore in the valve housing. Because this sealing sleeve, which is formed of a suitable plastics, is compressed when forced into the tapered bore, it also requires pressure relief areas. Accordingly, the valve body in its later illustrated construction has longitudinal and circumferential ribs on its outer side wall with spaces therebetween so that the ribs form pressure sealing areas and the spaces therebetween form pressure relief areas to which the plastics material of the sealing sleeve can flow when the valve unit is forced into the tapered bore.

In one embodiment, the sealing sleeve on the outer wall of the valve body and the sealing liner on the bore are integral and moulded to the valve body. Because the sealing sleeve and the sealing liner are integral with each other, the pressure relief areas become more important to enable flow of the plastics material due to forces acting on both the outer sealing sleeve and the inner sealing liner.

The invention will become further apparent upon a reading of this description which is given by way of example with reference to the accompanying drawings, wherein.

Figure 1:
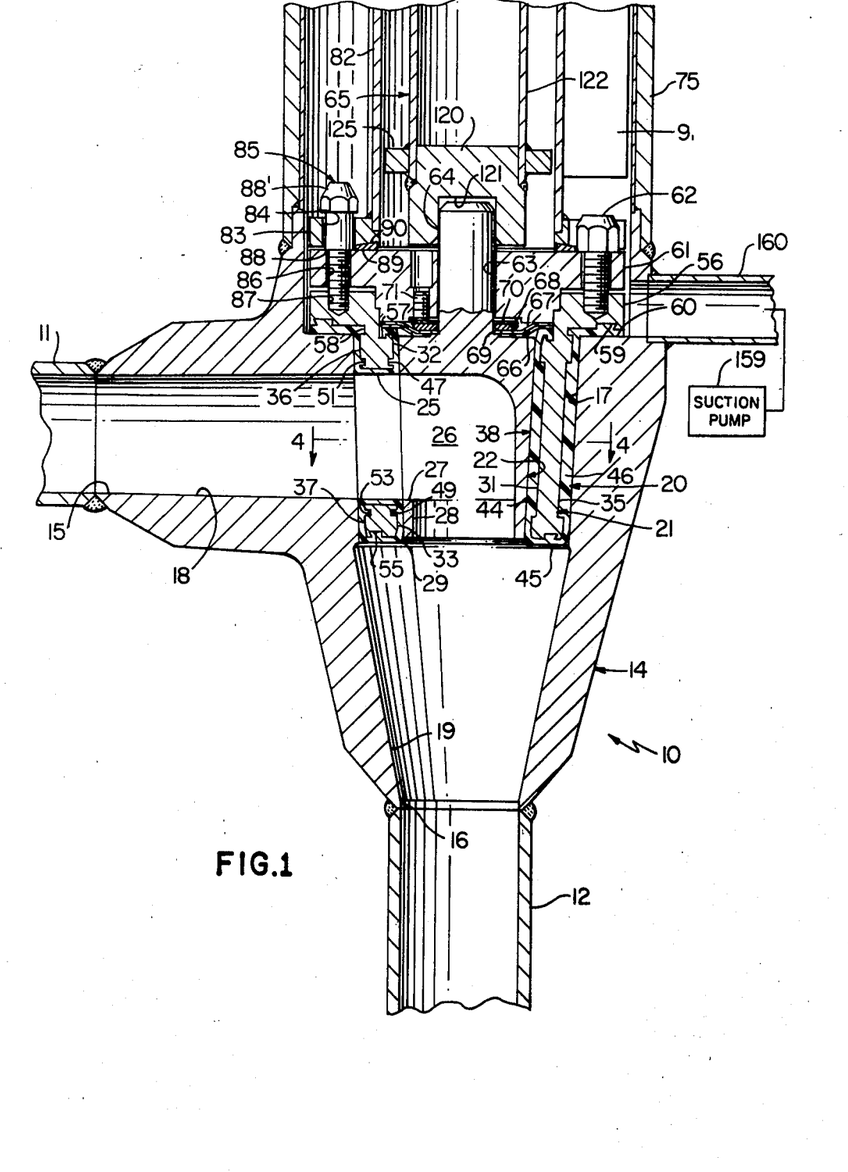
FIG. 1 is a sectional view of a lower portion of a valve assembly of a present invention with a moulded plastics seal.

Referring to the drawings and particularly FIG. 1, there is shown a valve assembly 10, which is connected between an inlet pipe 11 and an outlet pipe 12. The valve assembly 10 includes a housing 14, which has the pipes 11 and 12 welded thereto. The housing 14 has an inlet port 15 communicating with the inlet pipe 11 and an outlet port 16 communicating with the outlet pipe 12.

The housing 14 has a tapered bore 17 therein communicating with the inlet port 15 through a passage 18 and with the outlet port 16 through a passage 19. The bottom of the tapered bore 17 is open to provide communication with the outlet port 16, which is in the bottom of the housing 14.

A removable valve unit 20 is disposed within the tapered bore 17 in the housing 14 to control flow of fluid, which can be a radioactive slurry, for example, from the inlet port 15 in the housing 14 to the outlet port 16 in the housing 14. The valve unit includes a tapered valve body 21 having a tapered rotatable valve member 22 therein. The rotatable valve member 22 is rotatable between an open or first position in which the radioactive slurry can flow from the inlet pipe 11 to the outlet pipe 12 and a closed or second position in which flow therebetween is stopped.

Figure 7:
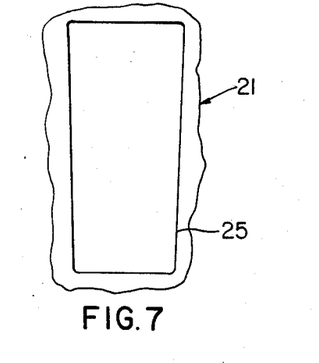
FIG. 7 is an elevational view showing the shape of the inlet port for the valve body of the valve assembly of FIG. 1.

The valve body 21 has an inlet port 25 in its tapered side wall communicating with the inlet port 15 in the housing 14 through the passage 18. As shown in FIG. 7, the width of the inlet port 25 tapers from its upper end to its lower end. The passage 18 (see FIG. 1) has the same shape adjacent the inlet port 25 so that no turbulence is produced in the flow. The inlet port 25 in the valve body 21 communicates with a passage 26 in the rotatable valve member 22 through an inlet port 27 which has the same shape as the inlet port 25, in the tapered side wall of the rotatable valve member 22.

The passage 26 in the rotatable valve member 22 communicates through an outlet port 28 in the rotatable valve member 22 with an outlet port 29 in the valve body 21. The outlet port 29 communicates through the passage 19 with the outlet port 16 in the housing 14.

The outlet ports 28 and 29 are the same shape. They are circular in shape. Thus, the passage 26 must change from the shape of the inlet port 27 to the shape of the outlet port 28 without creating any significant turbulence in the flow.

The outlet port 28 is in the bottom end of the rotatable valve member 22, and the outlet port 29 is in the bottom end of the valve body 21. Therefore, when the rotatable valve member 22 is moved to its closed position, all of the radioactive slurry within the passage 26 in the rotatable valve member 22 drains therefrom because of the position of the outlet port 28. Accordingly, when the valve unit 20 is removed from the tapered bore 17 in the housing 14 for replacement, none of the radioactive slurry is retained in the valve unit 20.

Figure 4:
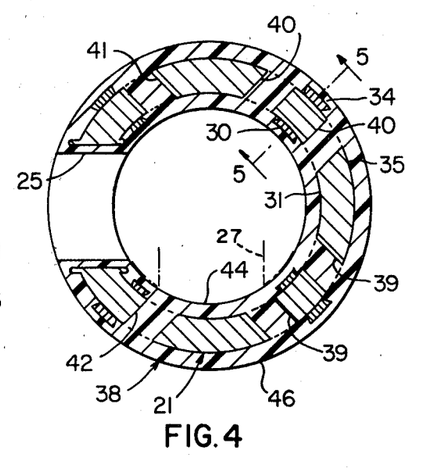
FIG. 4 is a sectional view of the valve body of the valve assembly of FIG. 1 and taken along line 4—4 of FIG. 1.
Figure 5:
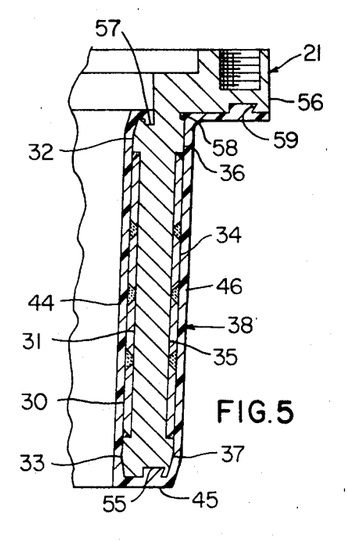
FIG. 5 is a fragmentary longitudinal sectional view of a portion of the valve body of FIG. 4 and taken along line 5—5 of FIG. 4.

As shown in FIGS. 4 and 5, the valve body 21 has a plurality (four) of longitudinal ribs 30 mounted on its tapered inner wall 31, which defines the tapered bore in the valve body 21, by welding or casting the ribs 30 integral with the inner wall 31, for example. The ribs 30 are substantially equally angularly spaced from each other and are spaced a sufficient distance from each other so that two of the ribs 30 are disposed on opposite sides of the inlet port 27 in the rotatable valve member 22 when the rotatable valve member 22 is in its closed position as indicated in phantom lines in FIG. 4.

The inner wall 31 of the valve body 21 has an upper continuous rib 32 (see FIG. 1) formed integral therewith above the inlet port 25 and a lower continuous rib 33 formed integral therewith beneath the inlet port 25. As shown in FIG. 5, the longitudinal ribs 30 cooperate with the continuous ribs 32 and 33 to form a continuous smooth inner surface extending inwardly beyond the inner wall 31 wherever the longitudinal ribs 30 are located.

The valve body 21 has a plurality (four) of longitudinal ribs 34 (see FIG. 4) mounted on its tapered outer wall 35 by welding or casting the ribs 34 integral with the outer wall 35, for example. Each of the ribs 34 is disposed in substantially radial alignment with one of the ribs 30 on the inner wall 31 of the valve body 21.

The outer wall 35 of the valve body 21 has an upper continuous rib 36 (see FIG. 5) formed integral therewith and a lower continuous rib 37 formed integral therewith. The upper continuous rib 36 is disposed in substantially the same horizontal plane as the upper continuous rib 32 and the lower continuous rib 37 is disposed in substantially the same horizontal plane as the lower continuous rib 33. The ribs 32, 33, 36, and 37 are disposed substantially orthogonal to the longitudinal ribs 30 and 34. As shown in FIG. 5, the longitudinal ribs 34 cooperate with the ribs 36 and 37 to form a smooth outer surface extending outwardly beyond the outer wall 35 wherever the ribs 34 are located.

The valve body 21 has a sealing liner 38 moulded thereto. The sealing liner 38 is formed of any suitable plastics and is preferably a fluorocarbon material. One suitable example of the fluorocarbon material is polytetrafluoroethylene.

Figure 6:
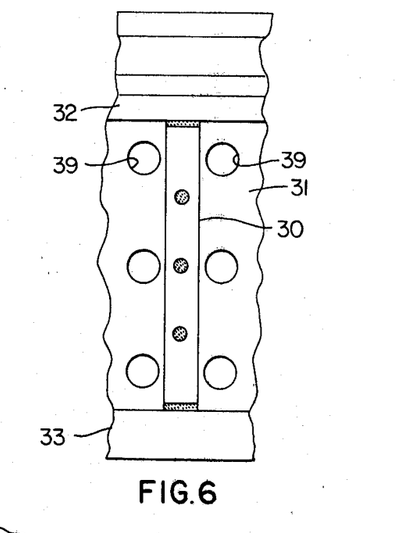
FIG. 6 is a fragmentary elevational view of a portion of the valve body of FIG. 4 with the sealing liner removed.

The valve body 21 has two rows of openings 39 (see FIG. 4) disposed on opposite sides of one of the four longitudinal ribs 30 and extending through the valve body 21. As shown in FIG. 6, there are three of the openings 39 in each of the two rows.

The valve body 21 has two rows of openings 40 (see FIG. 4) disposed on opposite sides of a second of the four ribs 30 and extending through the valve body 21, a single row of openings 41 disposed adjacent a third of the four ribs 30 and extending through the valve body 21, and a single row of openings 42 adjacent a fourth of the four ribs 30 and extending through the valve body 21. There are preferably the same number of the openings 40, 41 and 42 in each row as in each row of the openings 39.

Accordingly, when the sealing liner 38 is moulded to the valve body 21, the material of the sealing liner 38 extends through the openings 39 to 42 to form a bond. The sealing liner 38 includes an inner liner or sleeve 44 (see FIGS. 1 and 5), a bottom liner or connector 45, and an outer liner or sleeve 46 integral with each other and bonded to the valve body 21.

As shown in FIG. 1, the upper continuous rib on the valve body 21 forms a first pressure sealing area in cooperation with the rotatable valve member 22 and the lower continuous rib 33 on the valve body 21 forms a second pressure sealing area in cooperation with the rotatable valve member 22. Thus, these two pressure sealing areas form a seal around the top and bottom of the inlet port 27 in the rotatable valve member 22 irrespective of the position of the rotatable valve member 22. The second pressure sealing area forms a seal around the outlet port 28 in the rotatable valve member 22 irrespective of the position of the rotatable valve member 22.

The valve body 21 has a groove 47 in the inner wall 31 beneath the rib 32 only above the inlet port 25. The valve body 21 has a groove 49 above the rib 33 only beneath the inlet port 25. The grooves 47 and 49 provide pressure relief areas for the inner liner adjacent the pressure sealing areas at the inlet port 25. This enables the material of the inner liner 44 of the sealing liner 38 to not be subjected to stresses so as to rip or tear during rotation of the rotatable valve member 22 within the valve body 21.

As shown in FIG. 4, the spacings between the longitudinal ribs 30 provide relatively large pressure relief areas for the inner liner 44 in the remainder of the inner wall 31 of the valve body 21 because of the absence of the inlet port 25 with the ribs 30 forming longitudinal pressure sealing areas for the inner liner 44 between the continuous ribs 32 (see FIG. 5) and 33. Thus, the pressure sealing areas providing by one of the ribs 30 (see FIG. 4) on each side of the inlet port 25 in the valve body 21 produce a seal around the two sides of the inlet port 27 (see FIG. 1) in the rotatable valve member 22 when the rotatable valve member 22 is in its open position. Because of the spacing of the longitudinal ribs 30 (see FIG. 4), the inlet port 27 in the rotatable valve member 22 is disposed between two of the longitudinal ribs 30 when the rotatable valve member 22 is in its closed position, as shown in phantom, so that there is no tearing or ripping of the inner liner 44 when the rotatable valve member 22 moves between its open and closed positions.

The continuous ribs 36 (see FIG. 1) and 37 provide two pressure sealing areas for the outer liner 46 above and below the inlet port 25 in the valve body 21 when the valve unit 20 is disposed within the tapered bore 17 in the housing 14 as shown in FIG. 1. The valve body 21 has a groove 51 formed in its outer wall 35 beneath the upper rib 36 in the area above the inlet port 25 in the valve body 21 to provide a pressure relief area for the outer liner 46 above the inlet port 25 in the valve body 21. Similarly, the valve body 21 has a groove 53 in its outer wall 35 above the lower rib 37 in the area beneath the inlet port 25 in the valve body 21 to provide a pressure relief area for the outer liner 46 beneath the inlet port 25 in the valve body 21.

When the valve unit 20 is in the tapered bore 17 in the housing 14, the longitudinal ribs 34 (see FIG. 4) provide pressure sealing areas for the outer liner 46. The pressure sealing areas provided by one of the longitudinal ribs 34 on each side of the inlet port 25 in the valve body 21 produce a seal around the two sides of the inlet port 25 on the valve body 21.

The valve body 21 has a dovetail groove 55 (see FIGS. 1 and 5) in its bottom end to lock the bottom liner 45 of the sealing liner 38 thereto. This aids in retaining the sealing liner 38 on the valve body 21.

The valve body 21 has an outwardly extending flange 56 at its upper end. A retaining groove 57 is formed in the valve body 21 adjacent the flange 56 to receive the upper end of the inner liner 44 to retain it therein. The valve body 21 has a retaining groove 58 above the rib 36 to receive a portion of the outer liner 46 to ensure bonding of the outer liner 46 to the valve body 21.

The flange 56 of the valve body 21 has a dovetail groove 59 in its lower surface to retain the outer liner 46 in position. The outer liner 46 engages an annular surface 60 (see FIG. 1) in the housing 14 when the valve unit 20 is disposed within the tapered bore 17 in the housing 14 to form a seal therebetween.

The valve unit 20 includes a cover 61, which is secured to the flange 56 of the valve body 21 by a plurality (six, for example) of equally angularly spaced bolts 62. The cover 61 has a central bore or passage 63 through which a stem 64 on the upper end of the rotatable valve member 22 extends for rotation by rotating means 65, which fits over the stem 64 and extends upwardly toward an accessible location where the rotating means 65 is actuated. The rotating means 65 fits over the stem 64 so that the rotating means 65 can move longitudinally relative to the stem 64 while still rotating the stem 64 when desired.

A plastics diaphragm 66, which is preferably formed of a suitable plastics material such as polyethylene, is supported on top of the valve body 21 and has a portion overlying the upper end of the inner liner 44 of the sealing liner 38. A metallic diaphragm 67 overlies the plastics diaphragm 66 to protect the plastics diaphragm 66 from being cut by any burrs on the cover 61. The cover 61 holds the outer ends of the diaphragms 66 and 67 in engagement with each other to form a seal as shown in FIG. 1.

A thrust collar 68, which surrounds the stem 64, bears against the inner portion of the diaphragm 67 and a triangular shaped ring 69, which fits around the stem 64. An anti-static washer 70 overlies the thrust collar 68. Screws 71, which are mounted within the cover 61 and equally angularly spaced from each other, hold the anti-static washer 70 against the thrust collar 68. Thus, the rotatable seal is formed adjacent the stem 64.

The housing 14 has an extension tube 75 extending upwardly therefrom and secured thereto by suitable means such as welding, for example. The upper end of the tube 75 has a top ring 76 (see FIG. 2) welded thereto and extending through an opening 77 in a radioactive shielding concrete floor 78, which has a manhole cover 79 covering a manhole 80 communicating with the opening 77.

The ring 76 is welded to an inner can 81, which is supported by the concrete floor 78. Thus, the housing 14 (see FIG. 1) is fixedly supported at a specific location, which is remote from the manhole 80 (see FIG. 2).

The valve body 21 (see FIG. 1) has an extension tube 82, which has a flange 83 at its lower end, secured thereto. The flange 83 has a plurality (six, for example) of openings 84 therein disposed about its circumference at equal angles from each other and through which shoulder screws 85 extend. Each of the shoulder screws 85 is disposed between two of the bolts 62.

Each of the shoulder screws 85 extends through a passage 86 in the cover 61 and into a tapped hole 87 in the flange 56 of the valve body 21. Each of the shoulder screws 85 has a shoulder 88, which engages the top surface of the cover 61 to control the spacing of head 88' of the shoulder screw 85 from the top surface of the flange 83 when the valve unit 20 is disposed in the tapered bore 17 in the housing 14.

The top surface of the cover 61 has a thrust bearing ring 89, which is a portion of a sphere, resting thereon and disposed within an annular groove 90, which is a portion of a sphere, in the bottom surface of the flange 83. This arrangement provides an annular pressure area acting on the top surface of the cover 61, rather than point pressures, when the valve unit 20 is disposed within the tapered bore 17 in the housing 14 and the extension tube 82 is forced downwardly by a force exerted thereon. This downward force on the extension tube 82 moves the upper surface of the flange 83 away from the bottom surface of the head 88' of the shoulder screw 85 by which the valve unit 20 was supported during its downward movement.

The extension tube 82 has a plurality of longitudinal fins 91 on its circumference with the fins 91 being equally angularly spaced from each other. Each of the fins 91 has a slight clearance from the inner surface of the housing extension tube 75 to guide the valve unit 20 during its upward movement when being removed from the housing 14 and its downward movement when being disposed within the housing 14.

The upper end of the extension tube 82 has a flange 92 (see FIG. 2), which is secured to a shield plug 93 by screws 94. Thus, the shield plug 93 is connected to the valve body 21 (see FIG. 1) through the shoulder screws 85.

The shield plug 93 (see FIG. 2) includes a lower cylindrically shaped portion 95, which is disposed within the top ring 76 on the upper end of the housing extension tube 75, a second cylindrically shaped portion 96, which has a larger diameter than the portion 95, an inclined portion 97, and an upper cylindrically shaped portion 98, which has the largest diameter. The shield plug 93 has a pair of O-rings 99 disposed in grooves 100 in the portion 96 to seal against an inner cylindrical surface 101 of the top ring 76 of the housing extension tube 75.

Figure 2:
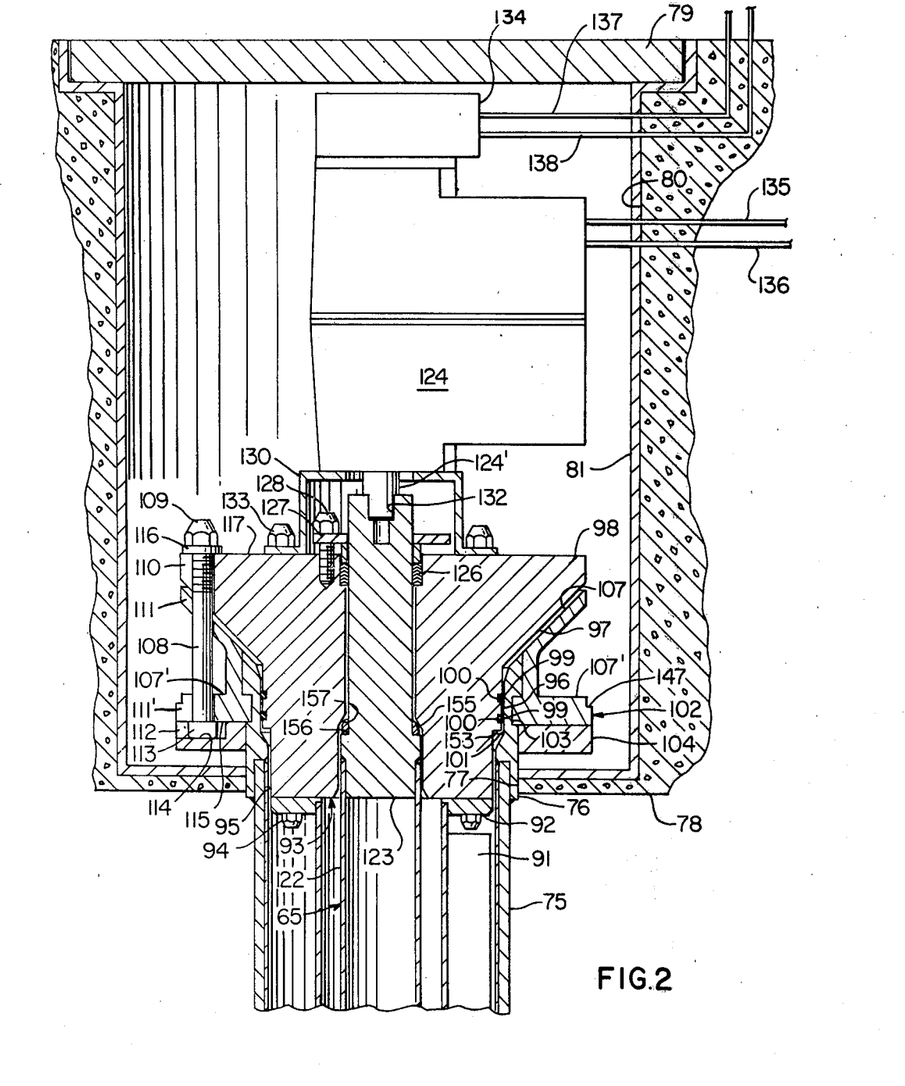
FIG. 2 is a sectional view of an upper portion of the valve assembly of FIG. 1 and having an arrangement for rotating a rotatable valve member of FIG. 1 at an accessible location remote from the location of the rotatable valve member and for removing the rotatable valve member from its location to the accessible location.

The top ring 76 of the housing extension tube 75 has a clamping ring 102 disposed in a groove 103 therein. The clamping ring 102 includes a lower bolt supporting portion 104, which is welded to the clamping ring 102.

Figure 3:
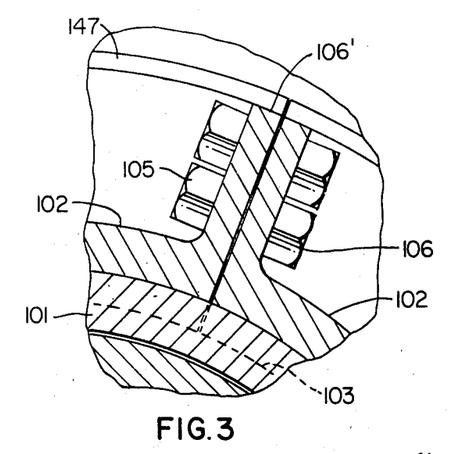
FIG. 3 is a fragmentary sectional view of a portion of the valve assembly of FIG. 2 and showing portions of a clamping ring secured to each other.

The clamping ring 102 with the lower bolt supporting portion 104 is formed in two semi-circular portions so that the top ring 76 can be assembled through the hole 77 in the concrete floor 78. Bolts 105 (see FIG. 3) and nuts 106 cooperate to secure adjacent flanges 106' of the two portions of the clamping ring 102 to each other. The flanges 106' extend between an inclined portion 107 (see FIG. 2) and an upper surface 107' of the clamping ring 102 at each end of each of the semi-circular portions of the clamping ring 102. The inclined portion 107 of the clamping ring 102 cooperates with the inclined portion 97 of the shield plug 93 to aid in guiding the shield plug 93 into the extension ring 76 and the housing extension tube 75.

When the valve unit 20 (see FIG. 1) is disposed within the tapered bore 17 in the housing 14, the shield plug 93 (see FIG. 2) is secured to the clamping ring 102 by a plurality (eight, for example) of retaining bolts 108 and cooperating nuts 109. Each of the bolts 108 is positioned through a slot 110 in the shield plug 93, a slot 111 in the inclined portion 107 of the clamping ring 102 vertically aligned with the slot 110, a slot 111' in the clamping ring 102 vertically aligned with the slots 110 and 111, and a slot 112 in the lower bolt supporting portion 104 of the clamping ring 102 vertically aligned with the slots 110, 111, and 111'.

Each of the bolts 108 has its head 113 positioned between a support surface 114 of the lower portion 104 of the clamping ring 102 and a bottom surface 115 of the clamping ring 102. The nut 109 acts through a washer 116 against a top surface 117 of the shield plug 93.

The tightening of the nuts 109 applies a downward force on the extension tube 82 so that this force is applied through the ring thrust bearing 89 (see FIG. 1) and the cover 61 to force the valve unit 20 into the desired position within the tapered bore 17 in the valve housing 14. This is necessary because the outer liner 46 of the sealing liner 38 protrudes beyond the tapered bore 17 of the housing 14. Thus, some of the material of the outer liner 46 is pushed into the pressure relief areas provided between the longitudinal ribs 34 (see FIGS. 4 and 5) on the outer wall 35 of the valve body 21.

The rotating means 65 (see FIG. 2) extends through the shield plug 93 for actuation. The rotating means 65 includes a lower adapter 120 (see FIG. 1), which has a recess 121 to receive the upper end of the stem 64 of the rotatable valve member 22. The rotating means 65 has a hollow torque shaft 122 extending from the lower adapter 120 to an upper adapter 123 (see FIG. 2), which extends beyond the top surface 117 of the shield plug 93 for actuation by an actuator 124.

One suitable example of the actuator 124 is a vane type actuator that utilizes pressurized air acting on a vane on a spindle 124' to move the rotatable valve member 22 (see FIG. 1) between its open and closed positions. The actuator 124 (see FIG. 2) is capable of being moved only 90° between the two positions through the pressurized air acting on only one side of the vane on the spindle 124' at any time.

The rotating means 65 has a bearing ring 125 (see FIG. 1) on the lower end of the outer surface of the shaft 122. The bearing ring 125 is slightly spaced from the inner circular surface of the extension tube 82 to provide better alignment of the rotating means 65 therein.

A gland seal 126 (see FIG. 2) surrounds the upper end of the upper adapter 123 of the rotating means 65 at its exit from the shield plug 93 to form a seal therebetween. The gland seal 126 is held in position by an L-shaped locking member 127 and a plurality of equally angularly spaced bolts 128.

The actuator 124 is supported by an actuator bracket 130 in vertically spaced relation to the top surface 117 of the shield plug 93 so that the spindle 124' of the actuator 124 can be disposed in a drive recess 132 in the top of the upper adapter 123 of the rotating means 65 to cause rotation thereof. The actuator bracket 130 is retained on the top surface 117 of the shield plug 93 by a plurality (three) of bolts 133, which are not equally angularly spaced.

The actuator 124 supports a switch box 134. The switch box 134 produces electrical signals to indicate whether the rotatable valve member 21 (see FIG. 1) is in its open or closed position. The switch box 134 (see FIG. 2) includes a pair of limit switches, which are closed and opened in accordance with the position of the rotatable valve member 21 (see FIG. 1).

Accordingly, with the valve unit 20 disposed in the tapered bore 17 in the housing 14, the rotatable valve member 21 can be moved between its open and closed positions from a remote control location through supplying pressurized air over one of a pair of hoses or lines 135 (see FIG. 2) and 136 and removing it from the other and vice versa in accordance with the position of the rotatable valve member 22 (see FIG. 1). The switch box 134 (see FIG. 2) supplies the signal back to the remote control location through electrical leads 137 and 138 to disclose that the rotatable valve member 22 (see FIG. 1) has been moved to the desired position.

Whenever it is necessary to replace the valve unit 20, the actuator 124 (see FIG. 2) and the switch box 134 are intially removed through removing the three bolts 133. Of course, it should be understood that the air lines 135 and 136 are disconnected from the actuator 124 and the switch box 134 is disconnected from the electrical leads 137 and 138.

The nuts 109 on the retaining bolts 108 are then loosened so that the retaining bolts 108 may be removed from retaining the shield plug 93 to the housing extension tube 75 through the clamping ring 102. The retaining bolts 108 are removed through sliding them outwardly through the side slots 110, 111, 111' and 112.

Then, a rotational entry guide 140 (see FIG. 9) is disposed over the shield plug 93 through having its longitudinal slot 141, which is between the ends of the rotational entry guide 140, receive a rotational guide pin 142 on the portion 98 of the shield plug 93. This positions the rotational entry guide 140 so that each of a pair of diametrically disposed jacking pads 143 (one shown in FIG. 8) on inner surface 144 of the rotational entry guide 140 will pass through a set of two of the vertically aligned side slots 110, 111, 111', and 112. The jacking pads 143 rest on the top surface 107' of the clamping ring 102 when the rotational entry guide 140 has its bottom end 146 bearing against an annular surface 147 on the circumference of the clamping ring 102.

In this position, a pin 148 (see FIG. 9) on the clamping ring 102 (see FIG. 2) positions the rotational entry guide 140 (see FIG. 9) at the desired location. The pin 148 is disposed in the longitudinal slot 141 in which the pin 142 is disposed. Thus, at this time, the pins 142 and 148 retain the rotational entry guide 140 at the desired position. This is the position in which the valve unit 20 (see FIG. 1) is properly disposed with respect to the inlet port 15 and the outlet port 16 in the housing 14.

The upper surface 117 (see FIG. 8A) of the shield plug 93 has a first pair of retaining bolts 149 mounted therein with one of the slots 110 in the portion 98 of the shield plug 93 for one of the bolts 108 disposed therebetween. A second pair of the retaining bolts 149 is diametrically disposed to the first set of the retaining bolts 149 and has one of the slots 110 in the portion 98 of the shield plug therebetween.

A retaining lug 150 is positioned beneath the heads of each pair of the retaining bolts 149 and has a threaded hole 151 extending therethrough. The threaded hole 151 in each of the retaining lugs 150 has a jacking bolt 152 extending therethrough and in the same vertical location as one of the bolts 108 (see FIG. 2) when the shield plug 93 is secured to the clamping ring 102. Thus, each of the jacking bolts 152 (see FIG. 8) will contact one of the jacking pads 142 as each of the jacking bolts 152 is rotated through the threaded hole 151 in one of the retaining lugs 150.

Figures 8, 8A:
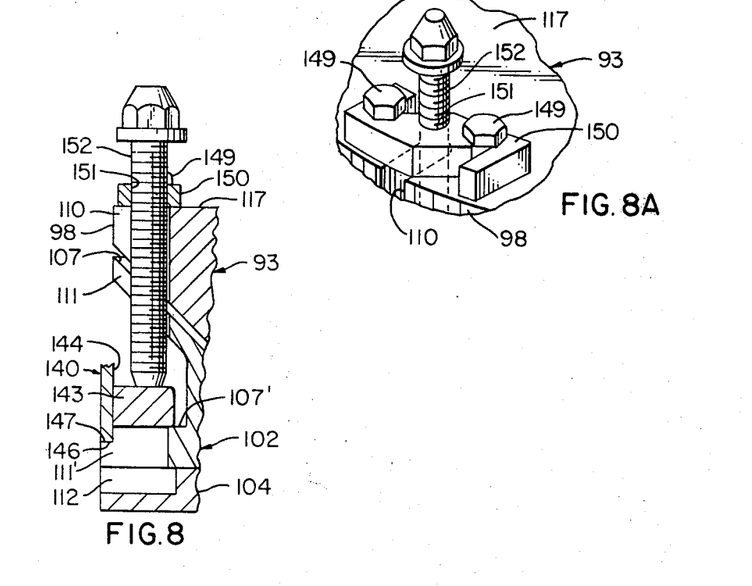
FIG. 8 is a fragmentary longitudinal sectional view of an arrangement for breaking a taper lock between the valve body and a housing of the valve assembly of FIG. 1.
FIG. 8A is a fragmentary perspective view of a portion of the arrangement of FIG. 8.
Figure 9:
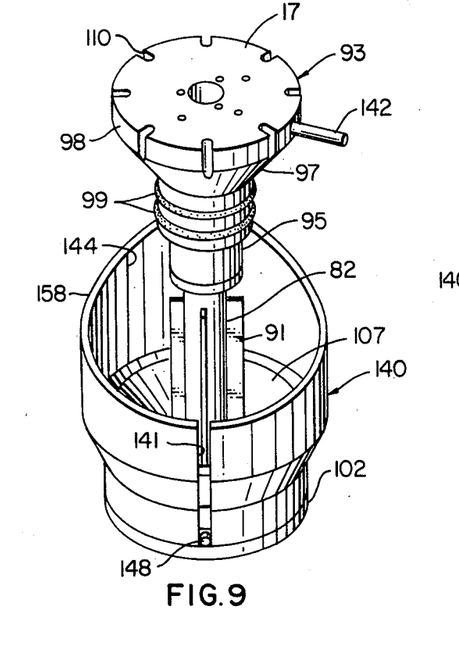
FIGS. 9, 10 and 11 are schematic perspective views showing the positioning of a valve unit of the valve assembly of FIG. 1 in the desired position within the housing.

After the bottom end of each of the jacking bolts 152 engages the top surface of one of the jacking pads 143 and this occurs at both of the pads 143 at substantially the same time, continued rotation of the jacking bolts 152 against the pads 142 produces a pressure on the shield plug 93 in an upward direction through each of the retaining lugs 150 acting on the heads of the adjacent pair of the bolts 149 (see FIG. 8A).

The upward movement of the shield plug 93 by the jacking bolts 152 lifts the extension tube 82 (see FIG. 1) upwardly so that the top surface of the flange 83 engages the bottom surface of the head 88' of the shoulder screw 85. After this occurs, continued upward movement of the shield plug 93 (see FIG. 2) through the jacking bolts 152 (see FIG. 8) breaks the taper lock of the valve body 21 (see FIG. 1) in the tapered bore 17 in the housing 14. Thus, the valve unit 20 is no longer locked within the housing 14 by the outer liner 46 of the sealing liner 38 having the tight fit with the tapered bore 17 in the housing 14.

The amount of the upward movement of the shield plug 93 (see FIG. 2) by the jacking bolts 152 (see FIG. 8) to break the taper lock is of such short distance that the seals 99 (see FIG. 2) still engage with the inner surface 101 of the top ring 76 of the housing extension tube 75. Thus, no contaminated air or "shines" can pass between the shield plug 93 and the top ring 76 because of an annular surface 153 at the bottom of the portion 96 of the shield plug 93.

After the jacking bolts 152 (see FIG. 8) have broken the taper lock of the valve body 21 (see FIG. 1) within the bore 17 in the housing 14, the jacking bolts 152 (see FIG. 8) are removed. Then, the two retaining lugs 150 are removed.

Next, the recess 132 (see FIG. 2) in the upper end of the upper shaft 123 of the rotating means 65 has a grapple head (not shown) connected thereto. The grapple head is to enable lifting of the valve unit 20 (see FIG. 1) by a winch.

A lower gamma gate (not shown), which includes a sliding plate, is then positioned within the manhole 80 (see FIG. 2) at the same location as the manhole cover 79 is disposed. A flask (not shown), which has an upper gamma gate (not shown) supported at its lower end and a winch (not shown) therein so that there is a sealed container within the flask when the upper gamma gate is closed, is next positioned with the upper gamma gate, which includes a sliding gate, on top of the lower gamma gate and connected thereto. The opening of the two gamma gates through their sliding gates provides access for the winch to automatically engage the grapple head.

The winch is then activated to lift the valve unit 20 (see FIG. 1) out of the tapered bore 17 in the housing 14. The upward lifting force is applied to the upper adapter 123 (see FIG. 2) of the rotating means 65 and then transferred through a lifting ring 55, which is supported on an annular shoulder 156 of the upper adapter 123 to engage an inclined cooperating surface 157 of the shield plug 93 to lift the valve unit 20 (see FIG. 1) since the valve unit 20 is connected to the shield plug 93 (see FIG. 2).

This utilization of the lifting ring 155 enables longitudinal movement of the rotating means 65 relative to the stem 64 (see FIG. 1) on the rotatable valve member 22. Additionally, the lifting force is applied through the shield plug 93 (see FIG. 2) to the valve body 21 (see FIG. 1) even though it is being applied through the rotating means 65. Therefore, the entire valve unit 20 is lifted even though lifting is being exerted through the rotating means 65. The lifting force is transmitted through the shoulder screws 85 by the upper surface of the flange 83 engaging the lower surface of the head 88' of each of the shoulder screws 85.

After the valve unit 20 is removed from the manhole 80 (see FIG. 2) into the flask, the two gamma gates are closed. Then, the flask, which has the upper gamma gate secured thereto, is disconnected from the lower gamma gate. Therefore, no radioactive contamination can reach the operator.

The new valve unit 20 (see FIG. 1) is disposed within another flask, which also has an upper gamma gate at its lower end with a winch at its upper end and within the flask. This is then disposed on the lower gamma gate and connected thereto.

Figure 10:
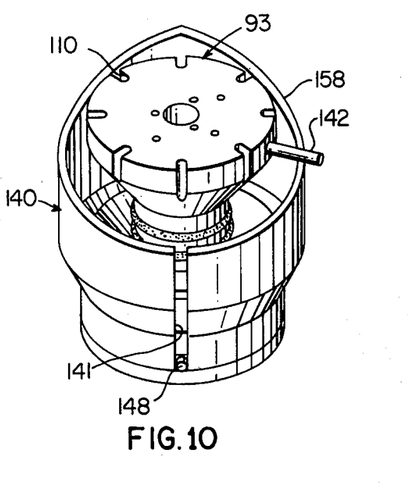

Then, the two gamma gates are opened and the winch activated to lower the new valve unit 20 into the tapered bore 17 in the housing 14. As the valve unit 20 enters the manhole 80 (see FIG. 2), the inclined portion 107 of the clamping ring 102 urges the valve unit 20 (see FIG. 1) into the top ring 76 (see FIG. 2) of the housing extension tube 75. The fins 91 aid in centering and aligning the valve unit 20 (see FIG. 1) in its entrance into the top ring 76 (see FIG. 2) of the housing extension tube 75 and its downward movement through the housing extension tube 75. As the shield plug 93 enters the manhold 80, the pin 142 (see FIG. 9) on the shield plug 93 engages a helical guideway 158 on the upper end of the rotational entry guide 140 as shown in FIG. 10. As the lowering of the valve unit 20 (see FIG. 1) by the winch within the flask continues, the pin 142 (see FIG. 10) rides down the guideway 158.

Figure 11:
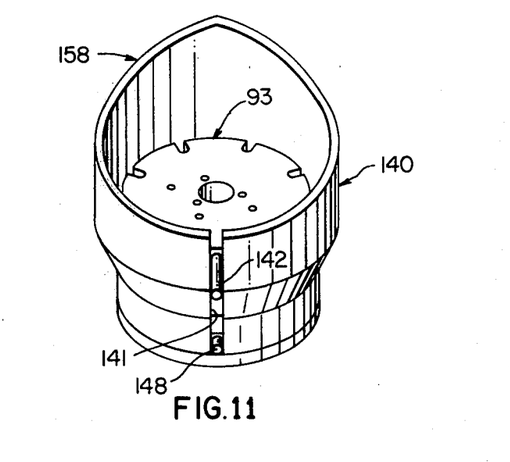

Eventually, the pin 142 (see FIG. 11) enters the longitudinally slot 141 in the rotational entry guide 140 and moves downwardly to the position shown in FIG. 11. This is the position in which the valve unit 20 (see FIG. 1) is disposed within the tapered bore 17 in the housing 14.

The pin 148 (see FIG. 9) on the clamping ring 102 (see FIG. 2) ensures that the rotational entry guide 140 (see FIG. 9) remains at the position in which it was initially disposed prior to removal of the valve unit 20 (see FIG. 1). Without the pin 148 (see FIG. 9), the rotational entry guide 140 could change position when the valve unit 20 (see FIG. 1) is removed from the tapered bore 17 in the housing 14 so that the new valve unit 20 would not return to the desired position.

With the valve unit 20 disposed within the tapered bore 17 in the housing 14, the winch grapple is automatically disengaged and winched up into the flask, and the gamma gates are then closed. The flask with the upper gamma gate is then disconnected from the lower gamma gate. Next, the lower gamma gate is removed. Following this, the rotational entry guide 140 (see FIG. 9) is removed, and the grapple head is removed from the recess 132 (see FIG. 2) in the upper end of the upper adapter 123 of the rotating means 65.

The bolts 108 are then positioned within the side slots 110, 111, 111', and 112 and a selected torque is applied to the nut 109 on each of the bolts 108. As the selected torque is applied to each of the nuts 109, the shield plug 93 is moved downwardly to apply a force through the thrust bearing ring 89 (see FIG. 1) to move the upper surface of the flange 83 away from the bottom surface of the head 88' of each of the shoulder screws 85 to seat the valve unit 20. This positions the valve unit 20 at the exact position within the tapered bore 17 in the housing 14 to have the desired port alignments.

After the nuts 109 (see FIG. 2) on the bolts 108 have been properly tightened, the actuator 124 has the spindle 124' connected to the upper adapter 123 of the rotating means 65 with the actuator bracket 130 mounted on the top surface 117 of the shield plug 93 and being connected to the shield plug 93 by the bolts 133. The switch box 134 is then connected to the electrical leads 137 and 138. Next, the actuator 124 is connected to the pressurized air hoses or lines 135 and 136. The manhole cover 79 is then disposed in the closed position.

During the removal of the valve unit 20 (see FIG. 1), a suitable suction pump 159 is connected to the housing 14 adjacent the location of the cover 61 through a tube 160. The suction pump 159 sucks air into the manhole 80 (see FIG. 2) for flow to the tube 160 (see FIG. 1) to prevent any possible radioactive contamination by air since air is drawn into the tube 160 and none can flow upwardly through the manhole 80 (see FIG. 2).

Figure 12:
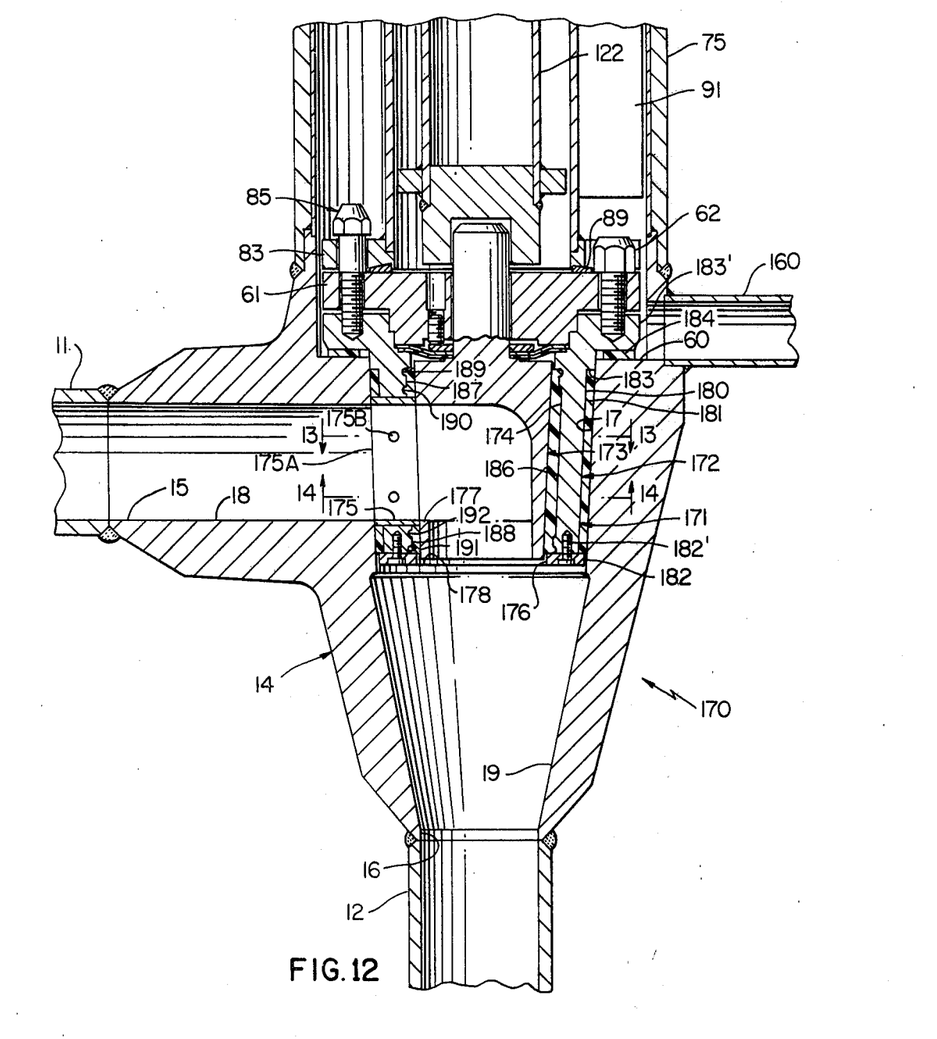
FIG. 12 is a sectional view of a lower portion of another embodiment of the valve assembly of the present invention utilizing replaceable plastics seals with the valve disposed at a remote location.

Referring to FIG. 12, there is shown a valve assembly 170, which is substantially the same as the valve assembly 10 except that a valve unit 171 is utilized in place of the valve unit 20.

The valve unit 171 includes a valve body 172 and a rotatable valve member 173 within the valve body 172. The valve body 172 is tapered to fit within the tapered bore 17 in the housing 14. The rotatable valve member 173 also is tapered to fit within a tapered bore, which is defined by side wall 174, in the valve body 172.

Figure 13:
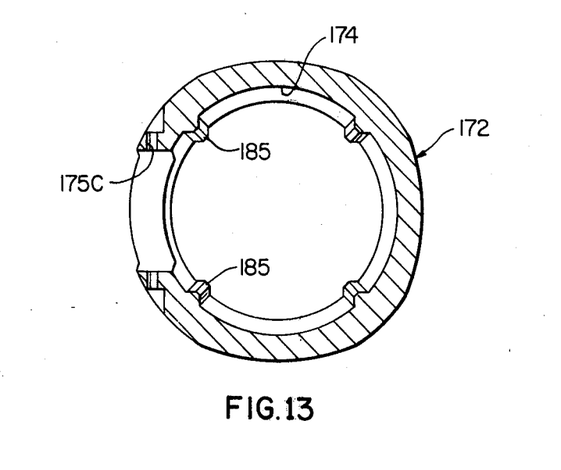
FIG. 13 is a sectional view of the valve body of FIG. 12 and taken along line 13—13 of FIG. 12.

The valve body 172 has an inlet port 175, which is the same shape as the inlet port 25 (see FIG. 7) in the valve body 21 (see FIG. 1) communicating with the inlet port 15 (see FIG. 12) in the housing 14. The inlet port 175 extends through the side wall 174 of the valve body 172 and is defined by a lip 175A secured to the valve body 172 by pins 175B driven in holes 175C (see FIGS. 13 and 14) in the side wall 174 of the valve body 172. The valve body 172 has an outlet port 176 (see FIG. 12), which is circular, in its bottom end communicating with the outlet port 16 in the housing 14.

The rotatable valve member 173 has an outlet port 177, which is the same shape as the inlet port 175 in the valve body 172, in its tapered side wall communicating with the inlet port 175 in the valve body 172 when the rotatable valve member 173 is in its open position. The rotatable valve member 173 has an outlet port 178, which is the same shape as the outlet port 176 in the valve body 172, in its bottom end communicating with the outlet port 176 in the valve body 172 at all times.

Therefore, in the same manner as the rotatable valve member 22 of FIG. 1, the rotation of the rotatable valve member 173 (see FIG. 12) to its closed position results in all of the radioactive slurry draining therefrom through the outlet port 178. Thus, whenever the valve unit 171 is removed from the tapered bore 17 in the housing 14, the rotatable valve member 173 will not have any radioactive slurry therein.

The tapered valve body 172 has a longitudinal cutaway portion 180 extending for a substantial length around its entire circumference except for the location of the inlet port 175 to receive a sealing sleeve or liner 81, which is retained within the portion 180. The valve body 172 includes a removable bottom end 182, which is secured by screws 182' to the valve body 172, to enable sliding of the sealing liner 181 over the outer surface of the valve body 172 until it engages an annular shoulder 183 and on which the sealing liner 181 is shrunk to have a tight fit.

The valve body 172 has an outwardly extending flange 183' at its upper end to overlie the annular surface 60 in the housing 14. An annular sealing element 184, which is supported on the flange 183', engages the surface 60 to form a seal therebetween.

The tapered inner side wall 174 of the valve body 172 has a plurality of longitudinal ribs 185 (see FIGS. 13 and 14) extending inwardly therefrom and angularly spaced from each other. The ribs 185 are spaced from each other so that the inlet port 177 (see FIG. 12) in the rotatable valve member 173 will be disposed between two of the ribs 185 (see FIGS. 13 and 14) when the rotatable valve member 173 is in its closed position as well as when the rotatable valve member 173 is in its open position.

A sealing liner or sleeve 186 (see FIG. 12) is mounted within the inner side wall 174 of the valve body 172 to form a seal with the rotatable valve member 173. The sealing liner or sleeve 181 and the sealing liner or sleeve 186 are preferably formed of the same material as the sealing liner 38 (see FIG. 1) of the valve assembly 10.

It should be understood that both the sealing liner 81 (see FIG. 12) and the sealing liner or sleeve 186 are held in position through the removable bottom end 182 and the lip 175A. Neither the removable bottom end 182 nor the lip 175A is disposed in position until both of the sealing liner or sleeve 181 and the sealing liner or sleeve 186 are at their desired positions.

The valve body 172 has an upper continuous rib 187, which is disposed above the inlet port 177. The valve body 172 has a lower continuous rib 188, which is disposed beneath the inlet port 177 and above the outlet port 176.

A pair of relief grooves 189 and 190 is disposed on opposite sides of the rib 187. Thus, the rib 187 functions as a pressure sealing area for the sealing liner or sleeve 186 with the grooves 189 and 190 functioning as pressure relief areas for the sealing liner or sleeve 186.

The rib 188 has an annular relief groove 191 beneath it and a relief groove 192 above it adjacent the outlet port 175 with the groove 192 continuing to the groove 190 in the areas of the inner side wall 174 in which the outlet port is not. Thus, the grooves 191 and 192 provide pressure relief areas for the sealing liner or sleeve 186 with the rib 188 functioning as a pressure sealing area for the sealing liner or sleeve 186.

The longitudinal ribs 185 (see FIGS. 13 and 14) provide pressure sealing areas for the sealing liner or sleeve 186 (see FIG. 12) in its engagement with the outer surface of the rotatable valve member 173. The areas between the ribs 185 (see FIGS. 13 and 14 ) provide pressure relief areas for the sealing liner or sleeve 186 (see FIG. 12).

Figure 14:
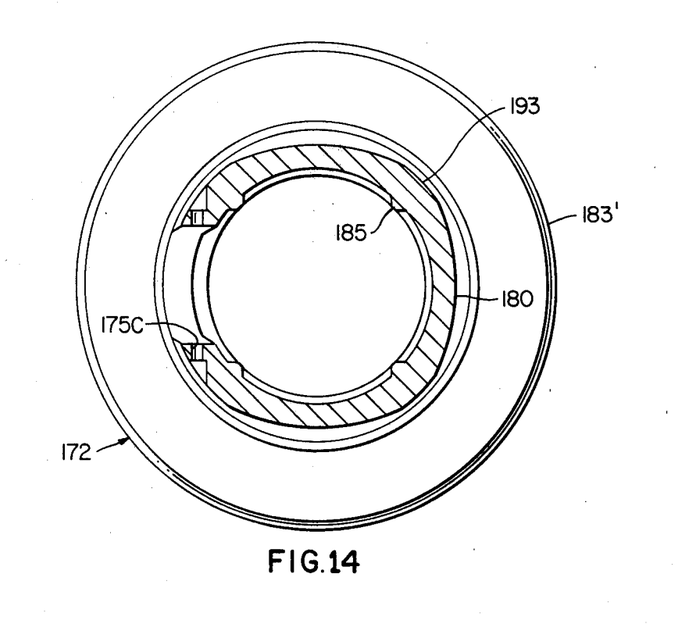
FIG. 14 is a sectional view of the valve body of FIG. 12 and taken along line 14—14 of FIG. 12.

As previously mentioned, the circumference of the tapered valve body 172 has the cut-away portion 180 within which the sealing liner 181 is disposed. As shown in FIG. 14, the valve body 172 has four areas of the portion 180 enlarged to function as ribs 193. These cooperate with the sealing liner or sleeve 181 (see FIG. 12) to form pressure sealing areas with the spaces therebetween functioning as pressure relief areas. Thus, the ribs 193 (see FIG. 14) function to ensure that the sealing liner or sleeve 181 (see FIG. 12) has sufficient relief areas as well as pressure sealing areas with the housing 14.

The remainder of the structure of the valve assembly 170 is substantially the same, if not the same, as that for the valve assembly 10 (see FIG. 1). Thus, it will not be described in further detail. However, it should be understood that the rotatable valve member 173 (see FIG. 12) is rotated in the same manner as the rotatable valve member 22 (see FIG. 1) and that the valve unit 171 (see FIG. 12) is removed from the housing 14 in the same manner as is the valve unit 20 (see FIG. 1).

The housing 14 has been illustrated as having only the single inlet port 15; however it should be understood that the housing 14 could have a plurality of inlet ports. These inlet ports would have to be disposed so that each of the inlet ports would be disposed between two of the longitudinal ribs 20 (see FIG. 4), for example. The number of the inlet ports might require an increase in the number of the longitudinal ribs 30 and a decrease in the spacing therebetween by reducing the size of the inlet ports.

While the outlet port 16 (see FIG. 1) in the housing 14 has been illustrated as being disposed perpendicular to the inlet port 15, it should be understood that the outlet port 16 could be axially aligned with the inlet port 15. This would require the rotatable valve member 22 of the valve unit 20, for example, to have the passage 26 extend straight through.

An advantage of the illustrated construction is that the valve unit may be removed from a radioactive contaminated area without subjecting the operator to an unacceptable level of radioactive contamination. A further advantage of this invention is that there is no possibility of the valve unit not being removable from its remote location due to any stripping of threads of bolts or screws since any such removable bolts or screws which must be removed are at the accessible location rather than at the remote valve unit location. Another advantage is that the sealing areas of the seal for the valve unit are constructed so that they are not subjected to ripping or tearing during rotation of the rotatable valve member of the valve unit. A still further advantage is that a rotatable valve member is properly positioned in a nonaccessible housing from an accessible location which is remote from the housing.

I claim:
1. A valve assembly including:
a housing;
a valve unit disposed in said housing for controlling the flow of fluid through said housing;
said housing having an upwardly opening bore to receive said valve unit;
said housing having at least one inlet port and an outlet port communicating with said bore;
said valve unit being removably mounted in said bore of said housing;
said valve unit including a valve body and a rotatable valve member;
said valve body having an upwardly opening bore to receive said rotatable valve member; said valve body providing subjacent support for said rotatable valve member to prevent downward movement of said rotatable valve member with respect to said valve body;

said valve body having at least one inlet port providing communication between said bore in said valve body and said one inlet port in said housing and an outlet port providing communication between said bore in said valve body and said outlet port in said housing;

said rotatable valve member having passage means extending therethrough providing communication between said one inlet port of said valve body and said outlet port of said valve body when said rotatable valve member is in a first position and said passage not providing communication between said one inlet port of said valve body and said outlet port of said valve body to prevent flow therebetween when said rotatable valve member is in a second position;

said housing having tubular extension means extending upwardly therefrom to a location remote from said above said housing;

said valve body having extension means connected thereto and extending upwardly therefrom within said tubular extension means of said housing;

first sealing means disposed between said extension means of said valve body and said tubular extension means of said housing;

rotating means disposed within said extension means of said valve body for actuation at a location remote from said above said housing to rotate said rotatable valve member at least between its first and second positions; said rotating means being upwardly movable independently of said rotatable valve member;

said extension means of said valve body being securely connected to said valve body to permit lifting and removal of said valve unit through said tubular extension means of said housing through application of a lifting force to said valve body extension means with all the lifting force on said rotatable valve member being applied through said valve body;

and second sealing means disposed between said extension means of said valve body and said rotating means.

2. The valve assembly according to claim 1, in which:
said extension means of said valve body includes a shield plug at its upper end;
said first sealing means seals against said shield plug;
and said second sealing means seals against said shield plug.

3. The valve assembly according to claim 2, in which:
said bore of said housing is tapered;
said valve body has its side wall tapered for disposition within said tapered bore of said housing;
said bore of said valve body is tapered;
and said rotatable valve member has its side wall tapered for disposition within said tapered bore of said valve body; said tapered bore of said valve body and said tapered side wall of said valve member coacting to provide said subjacent support.

4. The valve assembly according to claim 3 including means acting between said shield plug and said tubular extension means of said housing to exert a lifting force on said valve body to break the taper lock of said valve body in said housing.

5. The valve assembly according to claim 1, including:

said extension means of said valve body having guide means;

and means supported by said tubular extension means for cooperating with said guide means to position said valve body at a desired orientation in said housing.

6. The valve assembly according to claim 5, in which said supported means includes helical guide means to cooperate with said guide means on said extension means of said valve body, said helical guide means including a longitudinal slot for said guide means on said extension means of said valve body at the desired orientation.

7. The valve assembly according to claim 1, including a suction outlet provided from said housing and suction means for applying suction at said outlet whereby an air inflow is caused lengthwise of said tubular extension means from said location remote from said housing to said housing.

8. A valve assembly including:
a housing;
a valve unit disposed in said housing for controlling the flow of fluid through said housing;
said housing having an upwardly opening bore to receive said valve unit;
said housing having at least one inlet port and an outlet port communicating with said bore;
said valve unit being removably mounted in said bore of said housing;
said valve unit including a valve body and a rotatable valve member;
said valve body having an upwardly opening bore to receive said rotatable valve member; said valve body providing subjacent support for said rotatable valve member to prevent downward movement of said rotatable valve member with respect to said valve body;
said valve body having at least one inlet port providing communication between said bore in said valve body and said one inlet port in said housing and an outlet port providing communication between said bore in said valve body and said outlet port in said housing;
said rotatable valve member having passage means extending therethrough providing communication between said one inlet port of said valve body and said outlet port of said valve body when said rotatable valve member is in a first position and said passage means not providing communication between said one inlet port of said valve body and said outlet port of said body to prevent flow therebetween when said rotatable valve member is in a second position;
sealing sleeve means disposed between said housing and said valve body and mounted on the side wall of said valve body;
sealing lining means disposed in said bore in said valve body;
said valve body having means disposed in said bore and overlaid by said sealing lining means to provide pressure sealing areas for said sealing lining means to seal against said rotatable valve member and pressure relief areas for said sealing lining means therebetween; said valve body having means disposed on its outer side wall and overlaid by said sealing sleeve means to provide pressure sealing areas for said sealing sleeve means to seal against said housing and pressure relief areas for said sealing sleeve means therebetween;

said housing having tubular extension means extending upwardly therefrom to a location remote from and above said housing;

said valve body having extension means connected thereto and extending upwardly therefrom within said tubular extension means of said housing;

first sealing means being disposed between said extension means of said valve body and said tubular extension means of said housing;

rotating means being disposed within said extension means of said valve body for actuation at a location remote from and above said housing to rotate said rotatable valve member at least between its first and second positions; said rotating means being upwardly movable independently of said rotatable valve member;

said extension means of said valve body being securely connected to said valve body to permit lifting and removal of said valve unit through said tubular extension means of said housing through application of a lifting force to said valve body extension means with all the lifting force on said rotatable valve member being applied through said valve body; and second sealing means being disposed between said extension means of said valve body and said rotating means.

9. The valve assembly according to claim 8, in which:
said extension means of said valve body includes a shield plug at its upper end;
said first sealing means seals against said shield plug; and said second sealing means seals against said shield plug.

10. The valve assembly according to claim 9, in which:
said bore of said housing is tapered;
said valve body has its side wall tapered for disposition within said tapered bore of said housing;
said bore of said valve body is tapered; and said rotatable valve member has its side wall tapered for disposition within said tapered bore of said valve body; said tapered bore of said valve body and said tapered side wall of said valve member coacting to provide said subjacent support.

11. The valve assembly according to claim 10 including means acting between said shield plug and said tubular extension means of said housing to exert a lifting force on said valve body to break the taper lock of said valve body in said housing.

12. The valve assembly according to claim 8, in which said disposed means in said bore of said valve body includes:
a plurality of longitudinal ribs extending along the inside of said bore of said valve body, said sealing lining means overlying said ribs whereby said ribs form pressure sealing areas to seal against said rotatable valve member with the spaces therebetween being pressure relief areas for said sealing lining means; and said ribs being arranged so that at least one end of said passage means is disposed between two of said ribs when said rotatable valve member is in its first or second position.

13. The valve assembly according to claim 12, in which said disposed means on the outer side wall of said valve body includes a plurality of longitudinal ribs extending along the outer side wall of said valve body and having said sealing sleeve means overlying said ribs whereby said ribs form pressure sealing areas to seal against said housing with the spaces between said ribs being pressure relief areas for said sealing sleeve means.

14. The valve assembly according to claim 13, in which said disposed means on the inside of said bore of said valve body includes a first rib along the inside of said bore adjacent the lower end of said valve body and a second rib along the inside of said bore adjacent the top of at least said one inlet port in said valve body, each of said first and second ribs being substantially orthogonal to said longitudinal ribs, said sealing lining means overlying said first and second ribs whereby said first and second ribs form pressure sealing areas to seal against said rotatable valve member with the space therebetween being a pressure relief area for said sealing lining means except for the presence of one of said longitudinal ribs.

15. The valve assembly according to claim 14, in which:
said sealing sleeve means includes a liner integral with said sealing lining means; and said liner and said sealing lining means are moulded to said valve body.

16. The valve assembly according to claim 14, in which:
said rotatable valve member has said outlet port in its bottom end and at least said one inlet port in its side wall; and said outlet port in said valve body is at the bottom of said bore in said valve body and below said first rib and at least said one inlet port in said valve body is between said first and second ribs.

17. The valve assembly according to claim 16, in which:
said sealing sleeve means includes a liner integral with said sealing lining means; and said liner and said sealing lining means are moulded to said valve body.

18. The valve assembly according to claim 16 or 17 in which:
said bore of said housing is tapered;
said valve body has its side wall tapered for disposition within said tapered bore of said housing;
said bore of said valve body is tapered; and said rotatable valve member has its side wall tapered for disposition within said tapered bore of said valve body; said tapered bore of said valve body and said tapered side wall of said valve member coacting to provide said subjacent support.

19. The valve assembly according to claim 17, in which:
said extension means of said valve body includes a shield plug at its upper end;
said first sealing means seals against said shield plug; and said second sealing means seals against said shield plug.

20. The valve assembly according to claim 19, in which:
said bore of said housing is tapered;
said valve body has its side wall tapered for disposition within said tapered bore of said housing;
said bore of said valve body is tapered; and said rotatable valve member has its side wall tapered for disposition within said tapered bore of said valve body; said tapered bore of said valve body and said tapered side wall of said valve member coacting to provide said subjacent support.

21. The valve assembly according to claim 20, including means acting between said shield plug and said tubular extension means of said housing to exert a lifting force on said valve body to break the taper lock of said valve body in said housing.

22. A valve assembly including:

a housing;

a valve unit disposed in said housing for controlling the flow of fluid through said housing;

said housing having an upwardly opening bore to receive said valve unit;

said housing having at least one inlet port and an outlet port communicating with said bore;

said valve unit being removably mounted in said bore of said housing;

said valve unit including a valve body and a rotatable valve member;

said valve body having an upwardly opening bore to receive said rotatable valve member;

said valve body providing subjacent support for said rotatable valve member to prevent downward movement of said rotatable valve member with respect to said valve body;

said valve body having at least one inlet port providing communication between said bore in said valve body and said one inlet port in said housing and an outlet port providing communication between said bore in said valve body and said outlet port in said housing;

said rotatable valve member having passage means extending therethrough providing communication between said one inlet port of said valve body and said outlet port of said valve body when said rotatable valve member is in a first position and said passage not providing communication between said one inlet port of said valve body and said outlet port of said valve body to prevent flow therebetween when said rotatable valve member is in a second position;

said housing having tubular extension means extending upwardly therefrom to a location remote from and above said housing;

said valve body having extension means connected thereto and extending upwardly therefrom within said tubular extension means of said housing;

said valve body extension means including a shield plug remotely located from and above said valve body;

first sealing means disposed between said extension means of said valve body and said tubular extension means of said housing;

rotating means disposed within said extension means of said valve body for actuation at a location remote from and above said housing to rotate said rotatable valve member at least between its first and second positions;

said rotating means being upwardly movable independently of said rotatable valve member;

said rotating means cooperating with said shield plug to permit removal of said valve unit from said housing through lifting of said rotating means and transferring the lifting forces to said shield plug and thence through other portions of said valve body extension means to said valve body with all the lifting force on said rotatable valve member being applied through said valve body; and second sealing means disposed between said extension means of said valve body and said rotating means.

* * * * *